United States Patent [19]

Sheres

[11] 4,126,229
[45] Nov. 21, 1978

[54] RECORD ORGANIZER

[76] Inventor: Alan Sheres, 155 Deguire, Apt. 211; Ville St. Laurent, Montreal, Quebec, Canada

[21] Appl. No.: 834,869

[22] Filed: Sep. 20, 1977

[51] Int. Cl.$^2$ .............................................. A47G 79/00
[52] U.S. Cl. .......................................... 211/40; 312/15
[58] Field of Search .......................... 211/10, 11, 40; 312/10–19, 234.1–234.5; 40/63 R, 64 R, 65, 2, 10 R, 12, 16, 16.2, 16.4, 358

[56] References Cited

U.S. PATENT DOCUMENTS

| | | | |
|---|---|---|---|
| 385,341 | 7/1888 | Coddington | 312/234.5 X |
| 1,755,074 | 4/1930 | Ray et al. | 211/40 |
| 2,238,451 | 4/1941 | Roth | 211/40 |
| 2,330,173 | 9/1943 | Gordon, Jr. et al. | 312/15 |
| 2,719,069 | 9/1955 | Roberson | 312/18 |
| 3,765,738 | 10/1973 | Cobb | 312/11 |
| 3,779,621 | 12/1973 | Carless | 312/15 |

*Primary Examiner*—Roy D. Frazier
*Assistant Examiner*—Terrell P. Lewis

[57] ABSTRACT

An organizer device for storage, retrieval and replacement of closely spaced articles of substantially like-shape but of different contents. The device comprises a support frame provided with holding means for supporting the articles in a closely spaced manner. An identification code is associated with holding means to identify the location of the articles. An information storage tray is provided in the support frame and has a plurality of strip-like information carrying members which are displaceably held in sequential order on the tray to retain information identifying each of the articles in relation to the identification code.

3 Claims, 6 Drawing Figures

RECORD ORGANIZER

BACKGROUND OF THE INVENTION (a) Field of the Invention

The present invention relates to an organizer device for storing, retrieving and replacing articles quickly and which articles are closely spaced and of substantially like shape configuration and containing information different from one another, and more specifically, but not exclusively, for the storage and retrieval of phonograph record albums, magnetic tape cartridges, or the like articles.

(b) Decription of Prior Art

Various types of storage containers or devices have been provided whereby phonograph record albums can be stored either for protection or for providing easy access thereto. One device which provides easy access consists of a plurality of retaining slots placed one behind the other and each adapted to clamp a phonograph record album therebetween. An actuating mechanism provides that when the first one of the record albums is pulled forwardly the mechanism will cause each album held in the stack to swing forwardly, thereby permitting a person to go through a plurality of phonograph record albums in order to locate a particular one. However, such device with albums requires ample space as it must be positioned below eye level whereby one can look down on the stack in order to read the information on the albums as they are displaced by the mechanism. Also, the mechanism does require that the albums be spaced-apart a sufficient distance from one another whereby the displacement can occur. Therefore, the device is restricted in the number of phonograph record albums which can be stored in a predetermined amount of space and does not provide a system to return the album at its proper place in an easy rapid manner. Furthermore, the operation of the device is time-consuming.

Storage racks, also provided, require that in order to identify a particular phonograph record album in a stack of closely spaced albums, it is necessary to look at most of the albums within the stack. This is also the case with storage racks for magnetic tape cartridges.

SUMMARY OF INVENTION

It is a feature of the present invention to provide an organizer device which substantially overcomes all of the above-mentioned disadvantages and which permits identification of phonograph record albums, or the like articles, without the necessity of verifying other albums within the stack.

Another feature of the present invention is to provide an organizer device which is easy to use and which provides flexibility to permit modification of the stored articles and of the information identifying the said articles.

A further feature of the present invention is to provide an organizer device which is substantially economical to construct and which requires a minimum amount of space for storing a maximum amount of articles.

According to the above features, from a broad aspect, the present invention provides an organizer device for storage, retrieval and replacement of closely spaced articles of substantially like-shape but of different contents. The device comprises a support frame provided with holding means for supporting the articles in a closely spaced manner. An identification code is associated with the holding means to identify the location of the articles. An information storage tray is provided in the support frame and has a plurality of strip-like information carrying members which are displaceably held in sequential order on the tray to retain information identifying each of the articles in relation to the identification code and relative to the position of said articles in said support frame.

BRIEF DESCRIPTION OF DRAWINGS

A preferred embodiment of the present invention will now be described with reference to the accompanying drawings in which:

FIG. 3b is a cross-sectional view of the information carrying member;

DESCRIPTION OF PREFERRED EMBODIMENTS

Figure 1:
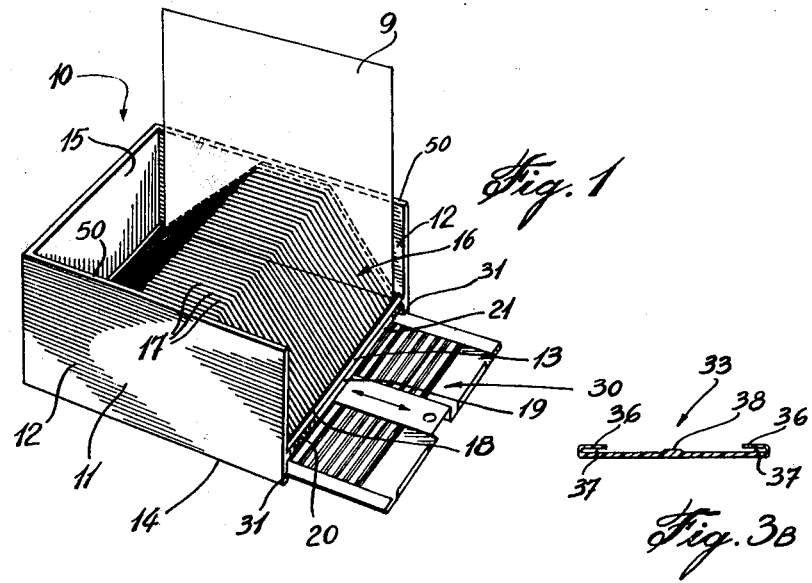
FIG. 1 is a perspective view of an embodiment of the record organizer as utilized for the storage of phonograph record albums.

Referring now to the drawings and more particularly to FIG. 1, there is shown generally at 10 the organizer device of the present invention for the storage and retrieval of closely-spaced articles of substantially like-shape configuration but having different contents, such as phonograph record albums, as shown at 9, or magnetic tape cartridges (not shown). The organizer device 10 comprises a support frame 11 which consists of opposed vertical side walls 12 extending substantially parallel to one another and a base wall 13 extending transversely across the vertical side walls 12 and spaced adjacent a bottom edge 14 of the side walls 12. A back wall 15 is also provided.

Holding means 16 is provided in the top portion of the support frame 11 for supporting the articles, herein phonograph record albums 9, in a vertical closely-spaced manner. In the case of magnetic tape cartridges, the holding means would be constituted by the base wall 13 or partition plates (not shown), as the cartridges would be stacked thereon in a horizontal side manner and in side-to-side relationship between the side walls 12.

The holding means 16 illustrated in FIG. 1 comprises a plurality of closely-spaced retention rods 17 extending between two substantially parallel spaced-apart securing rods 18 (one only being shown in this drawing). The retention rods 17 extend angularly upwards across the securing rods 18 a sufficient height to retain the record albums 9 in the gaps between adjacent retention rods 17. Of course, the phonograph records, without the albums, could also be positioned between the retention rods, but it is preferable to have some protection for the phonograph records. As shown, the securing rods 18 are fixed at opposed ends thereof to respective ones of the side walls 12 and the securing rods 17 are welded adjacent their respective ends to an associated one of the securing rods 18.

An identification code 19 is provided on the front face 21 of the base wall 13. The identification code 19 comprises a plurality of identification markings 20, each marking being associated with a respective gap formed between adjacent ones of the retention rods. Thus, each article 9 is associated with an identification marking, depending on its location, on the holding means 16. An identification sticker (not shown) may be placed anywhere on the albums 9 to identify quickly the proper replacement location.

Figure 2:
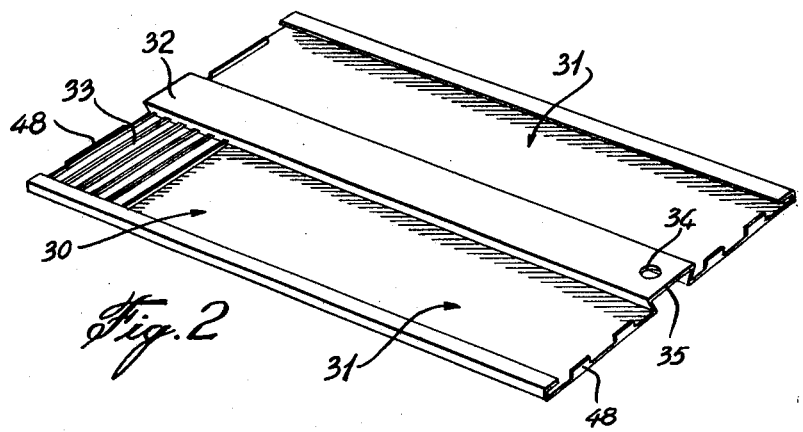
FIG. 2 is a perspective view of the storage tray associated with the record organizer shown in FIG. 1.
Figure 3A:
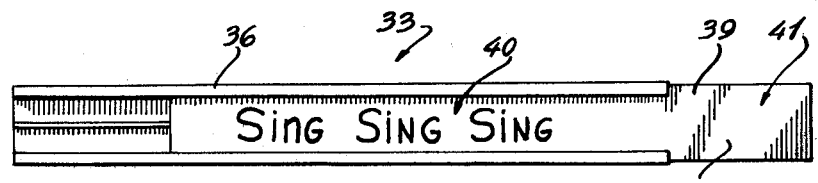
FIG. 3a is a plan view showing the construction and use of an information carrying member.
Figure 4:
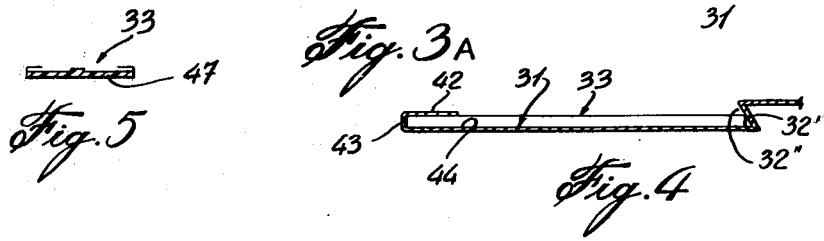
FIG. 4 is a fragmented section view of a portion of the storage tray.

Referring now additionally to FIGS. 2 to 4, there is shown the construction of an information storage tray 30 provided in the support frame 11 below the base wall 13. As shown in FIG. 2, the tray 30 consists of a substantially flat plate which is adapted to be slidingly retained within opposed channels 31 provided in the respective ones of the side walls 12 below the base wall 13 and adjacent the bottom edges 14. The storage tray 30 is herein shown as formed with two longitudinal recessed sections 31 and a central elevated section 32 therebetween formed to secure information carrying members 33 which are held in substantially parallel alignment and extend transversely over the associated ones of the recessed sections in a manner which will be described later. The tray 30 is slidable in and out of the support frame 11 by the provision of grip means 34 consisting of a hole formed adjacent the front edge 35 of the elevated section 32 whereby to constitute a finger grip. The elevated section 32 provides easier access for the finger when the support frame 11 is resting on the flat surface.

Referring now more specifically to FIGS. 3a and 3b, there is shown the construction of the information-carrying members 33 and they consist essentially of an extruded strip of flexible material, such as plastic, defining retention means 36 in the form of shoulders to define opposed elongated slots 37 along the member 33. a central elongated ridge 38 is also formed whereby to apply back pressure on an information strip 39 which is slid between the channels 37. As shown in FIG. 3a, the information strip 39 comprises an identification marking 40 identifying the contents of the specific article and a marking 41 giving the location of the article in the holding means 16 as identified by the identification code 19.

Referring again to FIG. 2, there is shown a preferred manner of holding the information-carrying members on the information tray 30. The flat plate tray is provided with opposed inwardly turned side edges 42 (see FIG. 4) to define a retaining slot 43 above an upper surface 44 of the recessed sections 31. The central elevated section 32 is formed with an inwardly angulated side wall 32' to define a recess 32" whereby to receive therein an end of said member 33. Each information-carrying member 33 is of sufficient thickness in at least opposed end portions thereof which are adapted to fit under the inwardly turned side edge 42 and the recess 32", respectively, to be frictionally retained within the slot 43 and recess 32" and be permitted to slide therealong whilst retaining its transverse position with respect to the long axis of the recessed section 31. To remove or insert the members 33 across the section 31, the members are bowed at the center causing the opposed ends to retract and permitting disengagement of the opposed ends and clearance from at least the slot 43 or recess 32".

Figure 5:
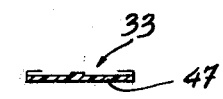
FIG. 5 is a cross-sectional view of an information carrying member showing a modification thereof.

Referring now to FIG. 5 there is shown a modification of the information-carrying member 33 and wherein a strip of magnetic material 47 is secured to the underside of the member 33. While this particular modification of the member 33 it would not be necessary to have the opposed side edges of the tray 30 bent inwardly to form the retaining slot 43 nor provide the recess 32" as the members 33 would be held by magnetic attraction. Of course, in this particular embodiment, the tray 30 is formed of steel sheet metal.

Stop means in the form of upwardly turned tabs 48 are provided at opposed ends of each recessed section 31 to limit the displacement of the members 33 along the sections 31. The stop means can also be constituted by providing permanently fixed members, such as the carrying members 33, adjacent the ends of the sections 31.

In a further modification of the present invention it is foreseen that the bottom edge 14 of the side walls 12 and their top edge 50 may be provided with inter-engaging means (not shown) to permit stacking of the support frames 11, one on top of the other. In an application where magnetic tape cartridges are stored and the top edge 51 lies in a plane above the magnetic cartridges, then the support frame 11 can be stacked one on top of the other. However, when supporting articles such as phonograph record albums, it is necessary that the side walls 12 be extended in their lower part whereby when stacked on top of another unit, the top edge of the album 9 lies below the information storage tray 30. Thus, the frame would have a slightly different configuration. It is further intended to cover other obvious modifications of the present invention provided such modification falls within the ambit of the present invention as defined by the appended claims.

I claim:

1. An organizer device for storage, retrieval and replacement of closely spaced flat plate-like articles of substantially like-shape but of different content, said device comprising in combination a support frame having opposed vertical side walls, a base wall transversely between a bottom edge of said side walls, and a back wall; a plurality of closely spaced retention rods extending between two substantially parallel spaced-apart securing rods securing between said side walls above said base wall, said retention rods extending angularly upwards across said securing rods a sufficient height to retain said articles between adjacent retention rods; an identification code having a plurality of markings each of which is associated with a respective gap between adjacent ones of said retention rods to identify the location of said articles; and an information storage tray slidingly supported under said base wall between said side walls, said tray having a substantially flat plate having two longitudinal recessed sections, opposed inwardly turned side edges defining a retaining slot above an upper surface of each said recessed sections, an elevated section extending centrally and parallel to said side edges and defining recesses facing a respective slot in each said edges, grip means in a front marginal area to insert and retract said plate from between opposed channels provided in said side walls; a plurality of flexible information carrying members held in substantially parallel alignment and extending transversely across an associated one of said recessed sections, said flexible members being capable of flexing transverse to their longitudinal axes by applying axial pushing force from an end thereof, said information carrying members each having a thickness in at least opposed end portions thereof sufficient for frictional retention between said retaining slot and recess while permitting sliding displacement therealong, said information carrying members each being provided with retention means to hold an information strip carrying information to identify an associated one of said articles in relation to a specific marking in said identification code.

2. An organizer as claimed in claim 1 wherein each said recessed sections is provided with stop means at opposed ends transverse to said inwardly turned side edges, said side edges being slidingly received within a respective one of said opposed channels.

3. An organizer device as claimed in claim 1 wherein said plurality of markings of said identification code being secured to a front face of said base wall, said gaps between said retention rods having groups with a spacing different than the remaining gaps, said bottom edge of said side walls and a top edge thereof having interengaging means to permit stacking of said support frame.

* * * * *